United States Patent
Garces et al.

(10) Patent No.: US 11,109,599 B2
(45) Date of Patent: Sep. 7, 2021

(54) SYSTEM AND METHOD FOR REGULATING THE FLOW OF SMOKE IN AN INDOOR SMOKER

(71) Applicant: Haier US Appliance Solutions, Inc., Wilmington, DE (US)

(72) Inventors: Tomas Garces, Louisville, KY (US); Daniel Carballo, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 205 days.

(21) Appl. No.: 16/240,852

(22) Filed: Jan. 7, 2019

(65) Prior Publication Data

US 2020/0214304 A1 Jul. 9, 2020

(51) Int. Cl.
*A23B 4/052* (2006.01)
*A47J 37/06* (2006.01)

(52) U.S. Cl.
CPC .......... *A23B 4/052* (2013.01); *A47J 37/0629* (2013.01)

(58) Field of Classification Search
CPC ....... A23B 4/052; A47J 37/07; A47J 37/0704; A47J 37/0709; A47J 37/0713
See application file for complete search history.

(56) References Cited

U.S. PATENT DOCUMENTS

| | | | | |
|---|---|---|---|---|
| 777,467 A * | 12/1904 | Yuncker | ............ | A23B 4/052 99/480 |
| 4,330,503 A * | 5/1982 | Allaire | ............ | F23B 5/00 110/203 |
| 4,344,358 A * | 8/1982 | Maurer | ............ | A23B 4/0053 126/193 |
| 4,700,618 A * | 10/1987 | Cox, Jr. | ............ | A21B 1/28 126/25 R |
| 4,909,235 A * | 3/1990 | Boetcker | ............ | A47J 37/0704 126/25 C |
| 6,868,777 B1 | 3/2005 | Higgins | | |
| 9,198,443 B2 | 12/2015 | Davis | | |
| 2006/0162576 A1* | 7/2006 | Upton | ............ | A01M 1/2088 99/467 |
| 2013/0206015 A1* | 8/2013 | Jacoby | ............ | A47J 37/07 99/330 |
| 2014/0360387 A1 | 12/2014 | Bogdon | | |
| 2016/0345598 A1* | 12/2016 | Bader | ............ | A23B 4/0523 |
| 2017/0238566 A1* | 8/2017 | Smith | ............ | A23B 4/0523 |
| 2019/0313848 A1* | 10/2019 | Sanchez | ............ | A23B 4/0523 |

* cited by examiner

*Primary Examiner* — Erin E McGrath

(74) *Attorney, Agent, or Firm* — Dority & Manning, P.A.

(57) ABSTRACT

An indoor smoker includes a smoking chamber fluidly coupled with an exhaust duct comprising a catalytic converter. A smoke regulating assembly selectively directs a flow of smoke through the smoking chamber and/or the exhaust duct. The smoke regulating assembly includes an outer housing defining an inlet aperture and an outlet aperture and a firebox positioned within the outer housing and defining a smoldering chamber. A control cylinder is rotatably mounted within the outer housing and around the firebox, the control cylinder defining a plurality of flow regulating apertures and being rotatable to selectively align the flow regulating apertures with the inlet aperture and the outlet aperture to regulate a flow of fresh air and the flow of smoke.

20 Claims, 10 Drawing Sheets

SYSTEM AND METHOD FOR REGULATING THE FLOW OF SMOKE IN AN INDOOR SMOKER

FIELD OF THE INVENTION

The present subject matter relates generally to indoor smokers, and more particularly to systems and methods of smoke regulation in indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

During a cooking or smoking process, it is frequently desirable to regulate the flow of smoke and/or fresh air into the smoking chamber, e.g., to supply the desired amount of smoke or to supplement the smoke with fresh air, e.g., to facilitate a cold smoking process. In addition, it may frequently be desirable to evacuate the smoking chamber to permit access to the smoking chamber without releasing smoke into the surrounding environment. For example, it may be desirable to pause the smoking process (without asphyxiating the combustible material), e.g., to check the food, to take an internal temperature measurement, or to "mop" the food with sauce or marinade.

Accordingly, a smoker that has features for improved smoke regulation during a smoking operation would be useful. More specifically, an indoor smoker that has features allowing a user to pause, terminate, or continue a smoking process and permit the introduction of cold smoke would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker defining a vertical, a lateral, and a transverse direction is provided. The indoor smoker includes a cabinet, a smoking chamber positioned within the cabinet, and a smoke regulating assembly operably coupled with the smoking chamber. The smoke regulating assembly includes an outer housing defining an inlet aperture and an outlet aperture, a firebox positioned within the outer housing, the firebox defining a smoldering chamber for receiving combustible material and a flow of fresh air to generate a flow of smoke, and a control cylinder rotatably mounted within the outer housing and around the firebox, the control cylinder defining a plurality of flow regulating apertures and being rotatable to selectively align the flow regulating apertures with the inlet aperture and the outlet aperture to regulate the flow of fresh air and the flow of smoke.

In another aspect of the present disclosure, a smoke regulating assembly operably coupled with a smoking chamber is provided. The smoke regulating assembly includes an outer housing defining an inlet aperture and an outlet aperture, a firebox positioned within the outer housing, the firebox defining a smoldering chamber for receiving combustible material and a flow of fresh air to generate a flow of smoke, and a control cylinder rotatably mounted within the outer housing and around the firebox, the control cylinder defining a plurality of flow regulating apertures and being rotatable to selectively align the flow regulating apertures with the inlet aperture and the outlet aperture to regulate the flow of fresh air and the flow of smoke.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
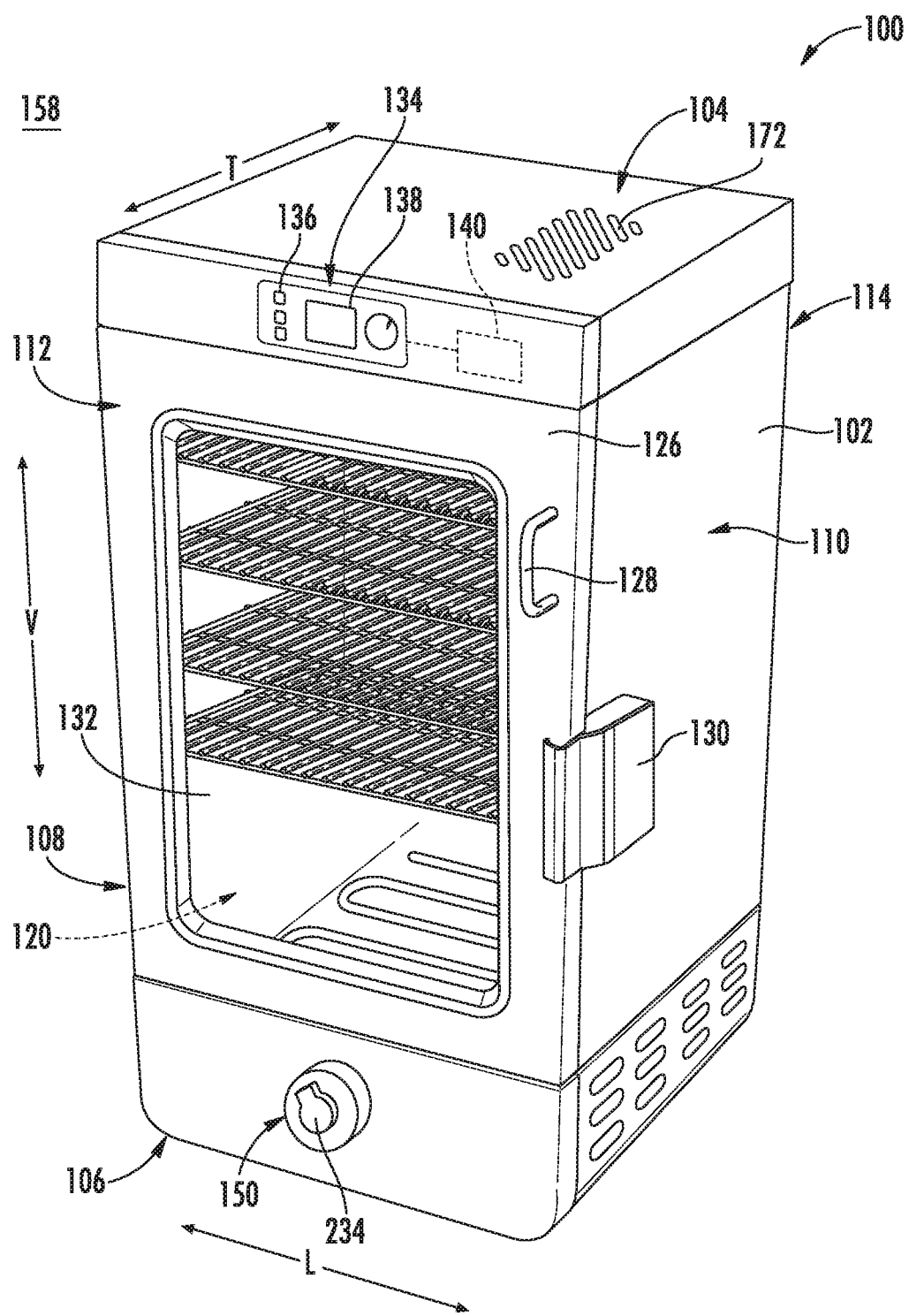
FIG. 1 provides a perspective view of an indoor smoker with a door in a closed position in accordance with an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

The present subject matter is generally directed to a method of generating smoke and managing airflow and smoke flow within an indoor smoker by using a smoke regulating assembly including a rotating diverter providing four modes of operation (i.e. smoking mode, evacuation and termination, evacuation and pausing, and cold smoke generator). Specifically, the smoldering chamber is combined with a rotating diverter or control cylinder which can be actuated manually or by a motor to change the air and smoke flow within the indoor smoker. A fan is used to create a low pressure volume inside the smoker and the smoldering chamber and pulls fresh air into the smoldering chamber to create smoke which gets delivered to the smoking chamber. The four basic modes of operations are:

1. Operating mode-smoking: The rotating diverter is positioned so that air can flow into the smoldering chamber thus getting contact with the wood pellets to produce smoke. Fresh air is sucked into the cavity and flows around the control cylinder to mix with the smoke and lower its temperature, allowing for the ability to cold smoke and to cool down the front section of the control cylinder. Besides, cooling down the smoke to close to ambient temperatures decouples the cooking of the food from the smoke temperature. This allows for better controlling of the cooking process as the cooking is done primarily by the cavity's heating elements.

2. Evacuation and termination: In this mode, the smoke box has no supply of fresh air nor outlet to let the smoke to escape. The smoldering chamber is sealed and no additional oxygen can enter, that way asphyxiating the smoldering wood. This enables evacuation of smoke in smoking chamber before opening the door and suffocating the smoldering compartment by depriving the wood of oxygen. This mode is used when the cooking session is over or if the user decides to end the process prematurely.

3. Evacuation and pausing: In this mode the smoke is bypassed directly into the catalyst housing. This enables evacuation of smoke before opening the door while continuing to provide oxygen to the smoldering chamber to keep the wood oxygenated and smoldering. This mode is used to access food in the smoking chamber for mopping, spraying, adding more food, etc.

4. Cold smoke: The rotating control cylinder is positioned for allowing two separate streams of air and smoke into the smoking chamber. This way smoke is mixed with fresh cold air to reduce temperature of the smoke and allow cold smoking mode. The cold smoke allows the user to impart a smoky flavor to cheeses, fruits, etc. These operating methods will be described below according to exemplary embodiments of the present subject matter.

Figure 2:
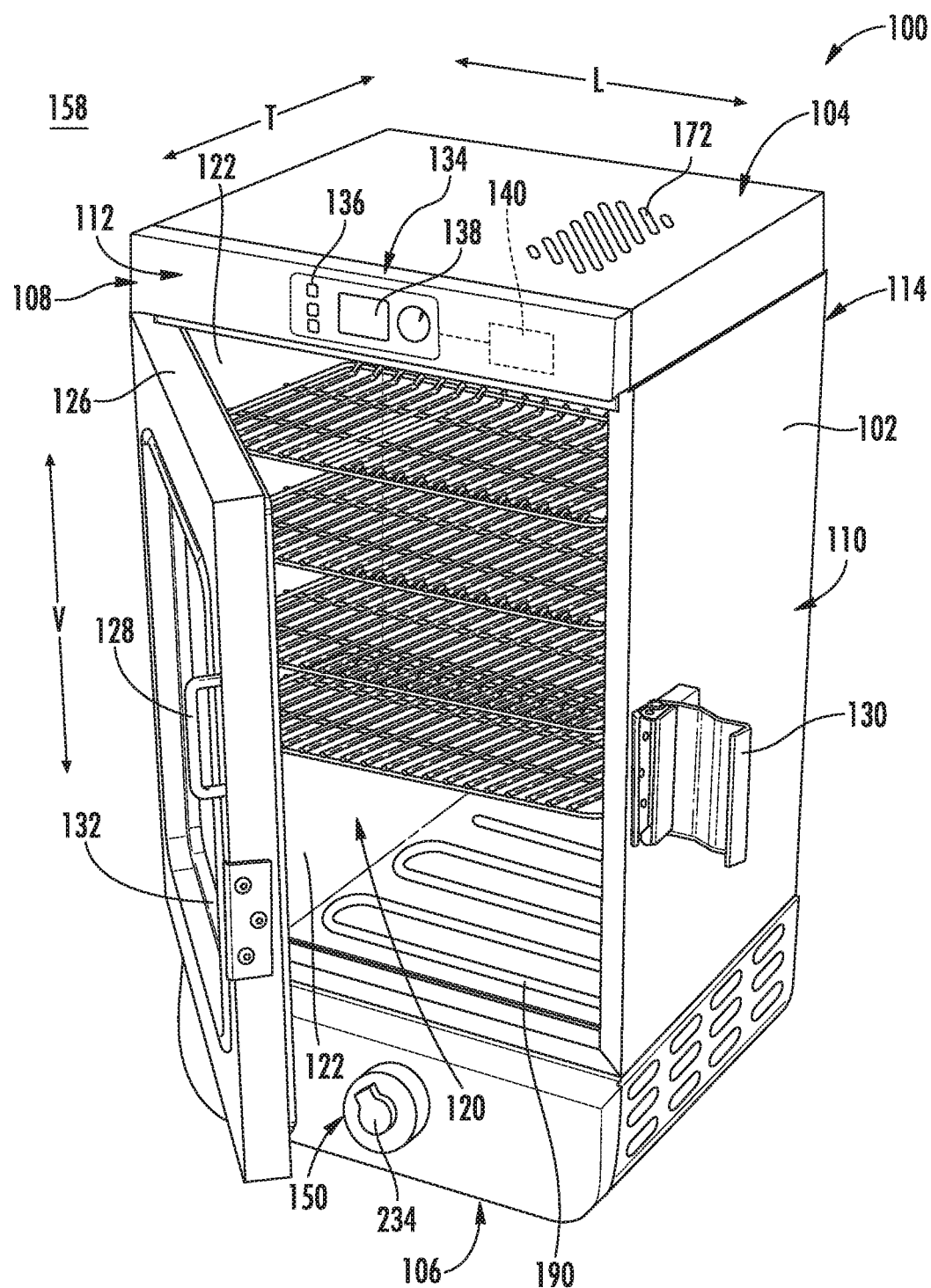
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material 124 (see FIG. 6), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or heated air in an appliance.

Figure 3:
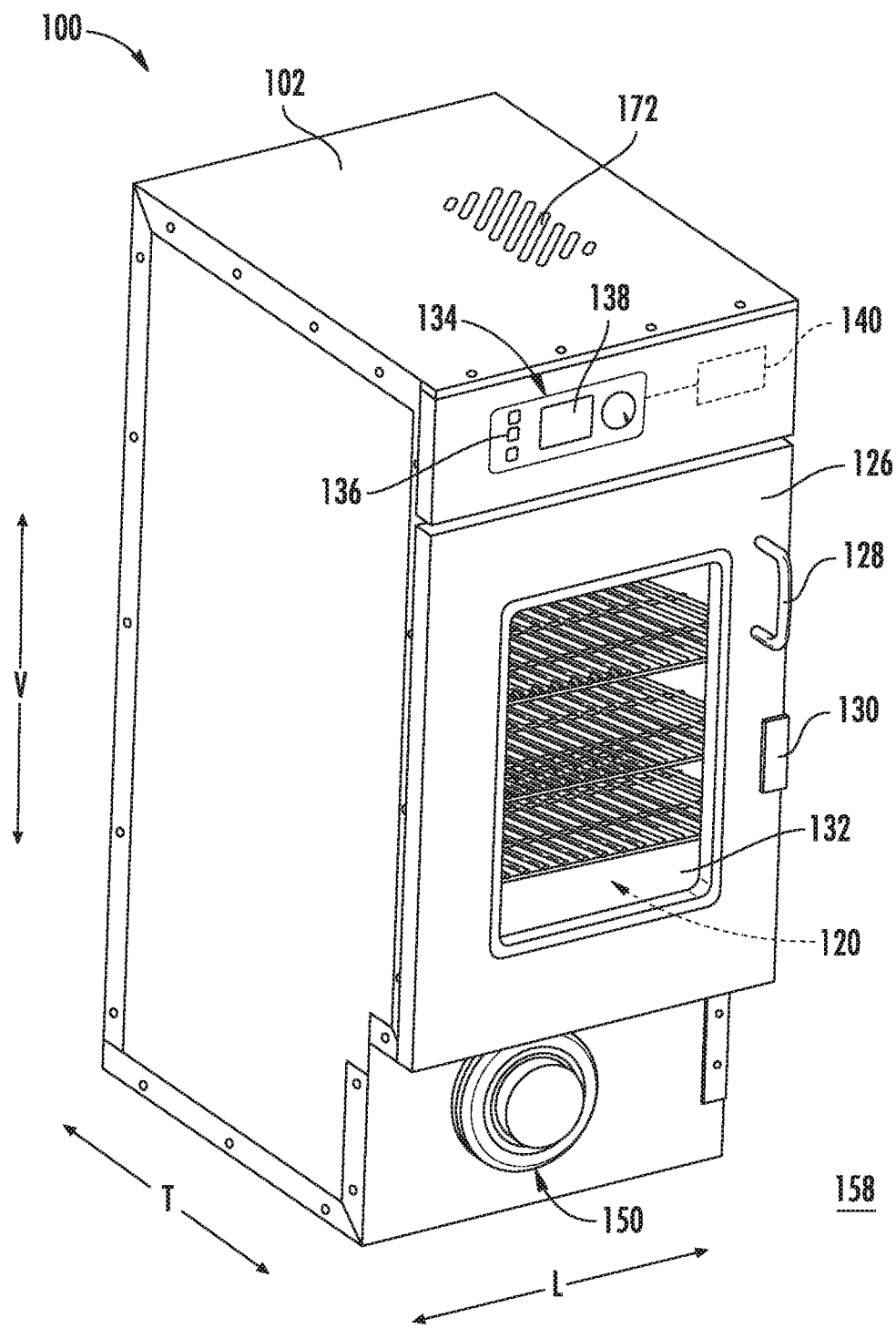
FIG. 3 provides a perspective view of the exemplary indoor smoker of FIG. 1 with a lower front panel removed.
Figure 4:
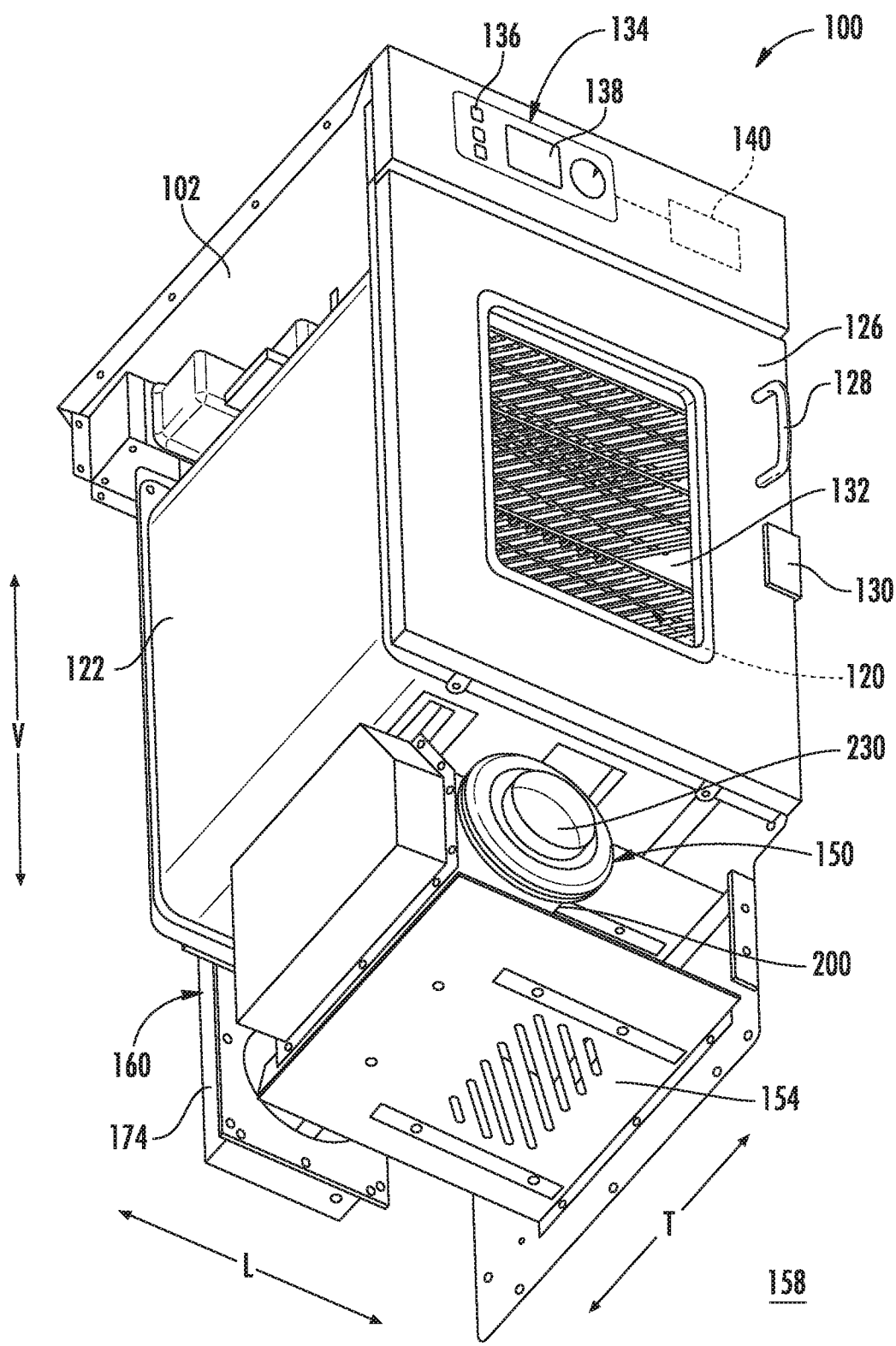
FIG. 4 provides a bottom, perspective view of the exemplary indoor smoker of FIG. 1 with a side panel and bottom panel removed for clarity.
Figure 5:
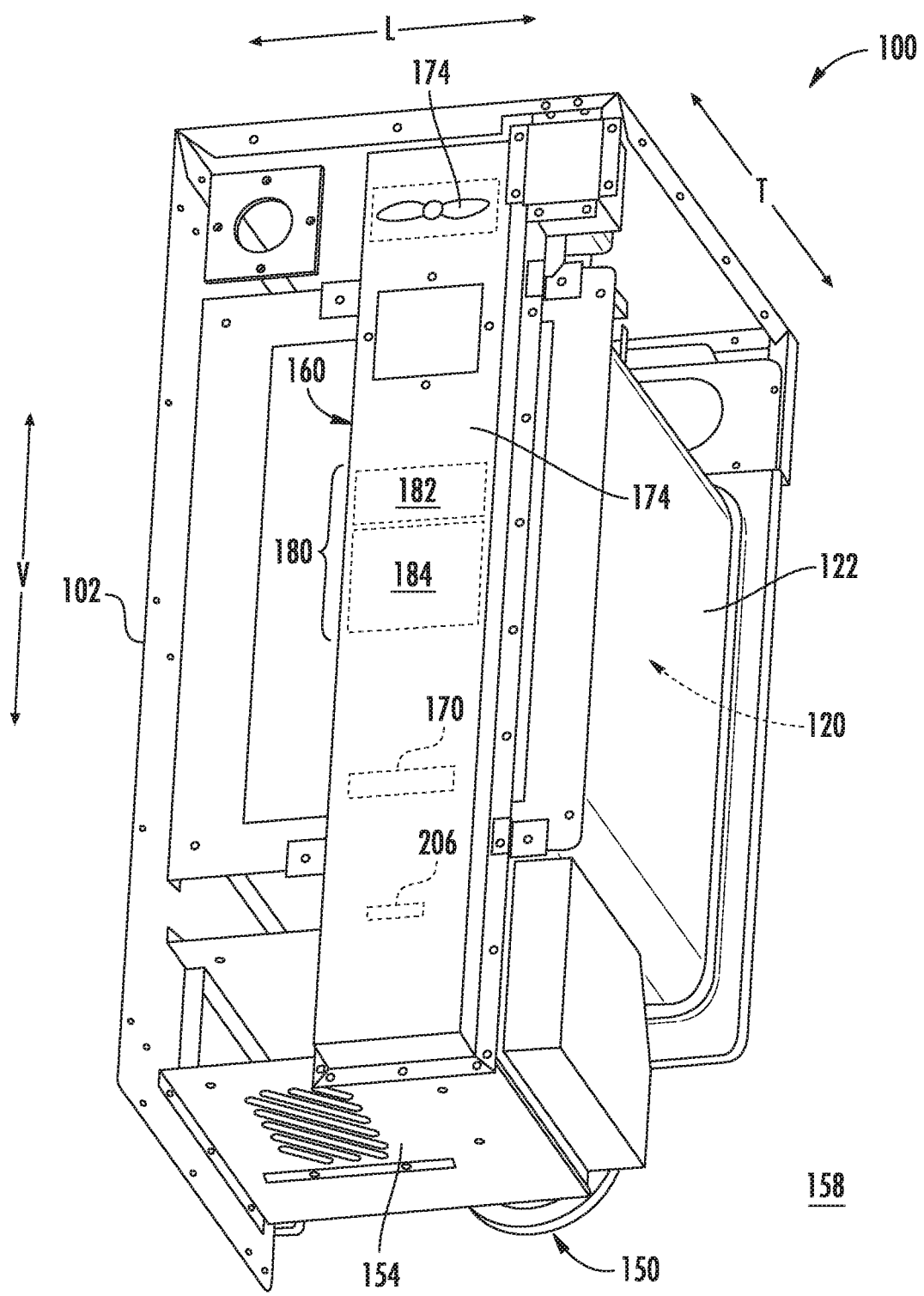
FIG. 5 provides a rear, perspective view of the exemplary indoor smoker of FIG. 1 with a side panel and bottom panel removed for clarity.
Figure 6:
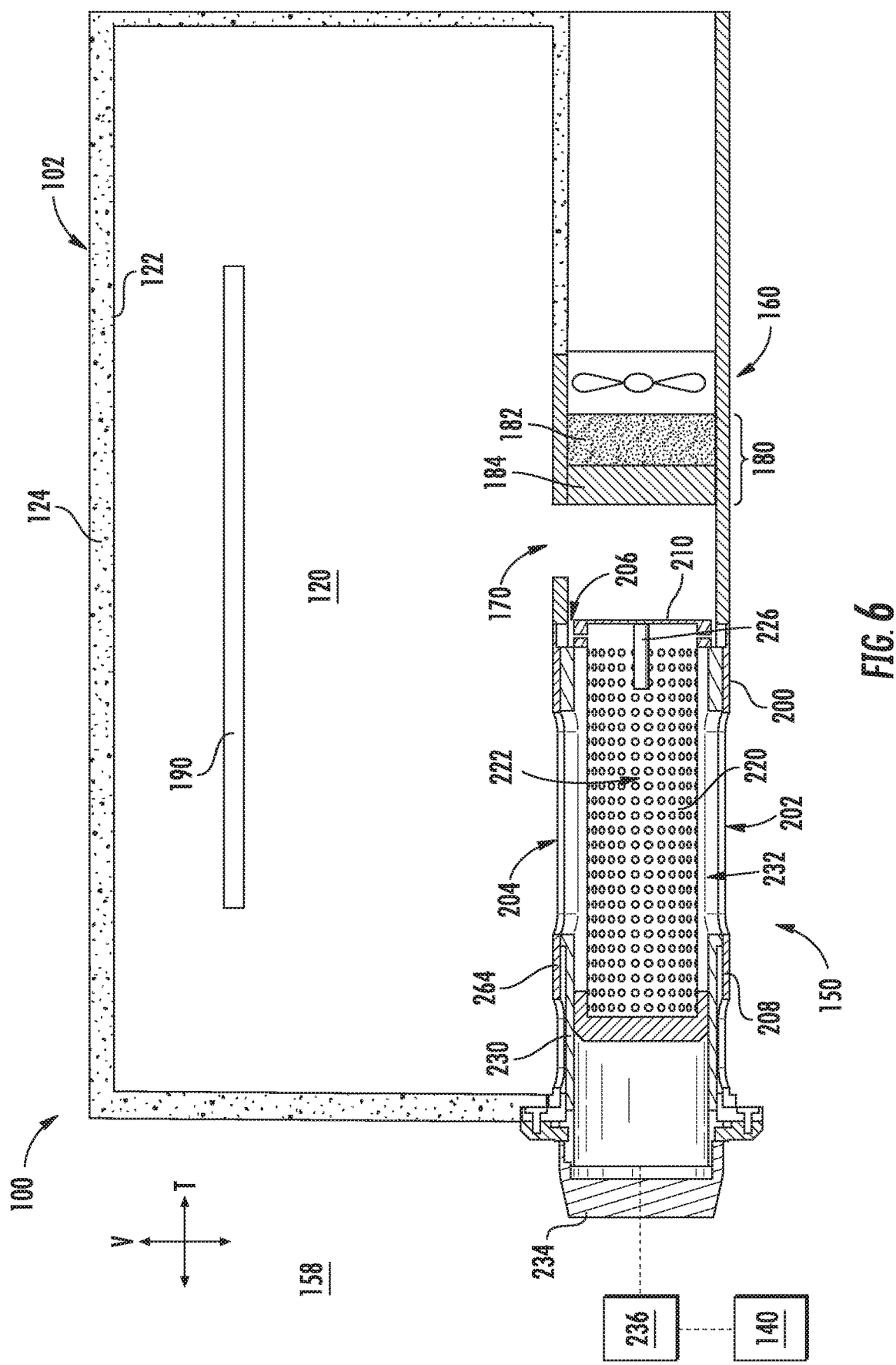
FIG. 6 provides a schematic view of a smoking chamber and smoke regulating assembly of the exemplary indoor smoker of FIG. 1.
Figure 7:
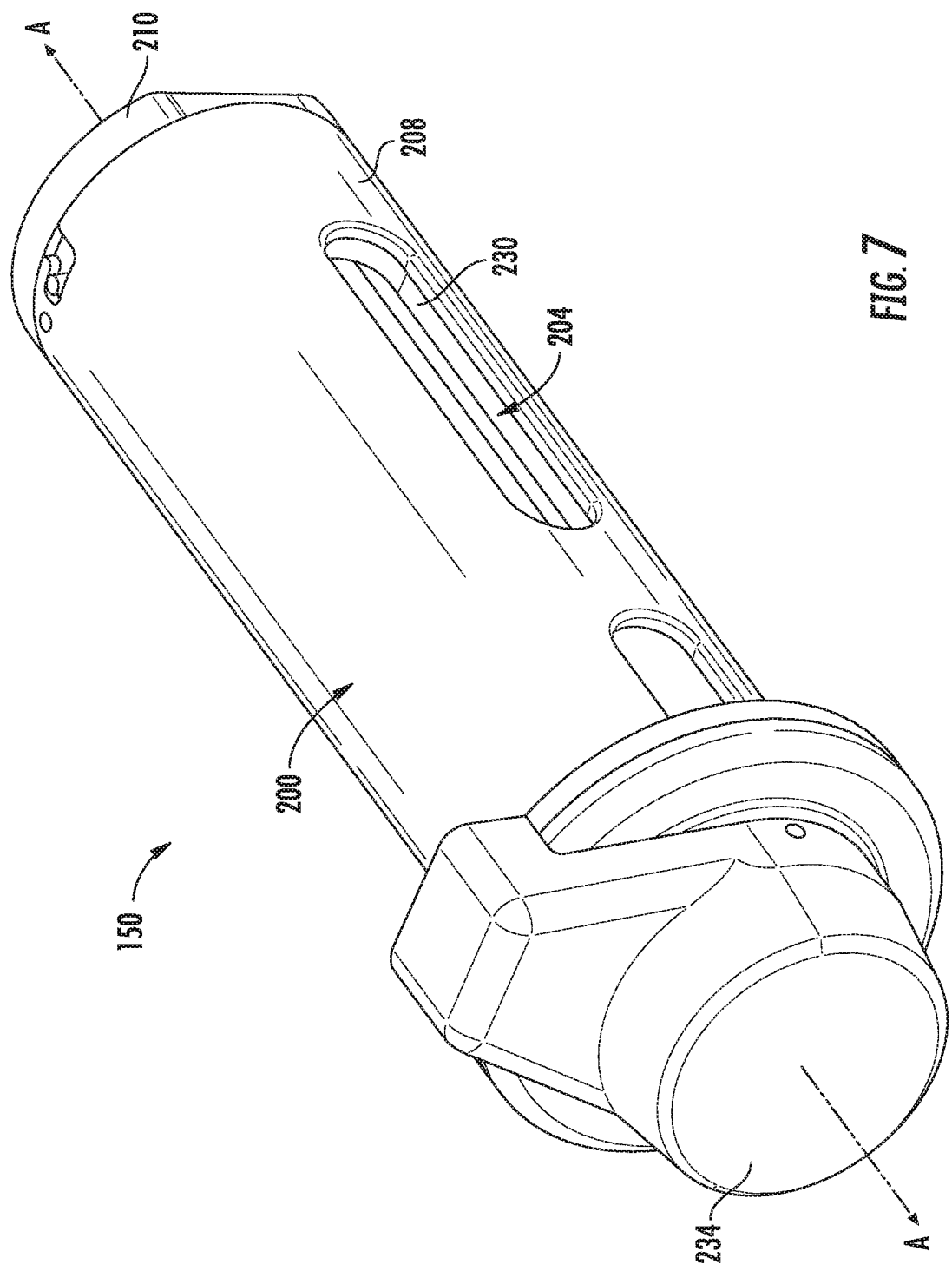
FIG. 7 provides a perspective view of the exemplary smoke regulating assembly of FIG. 6.
Figure 8:
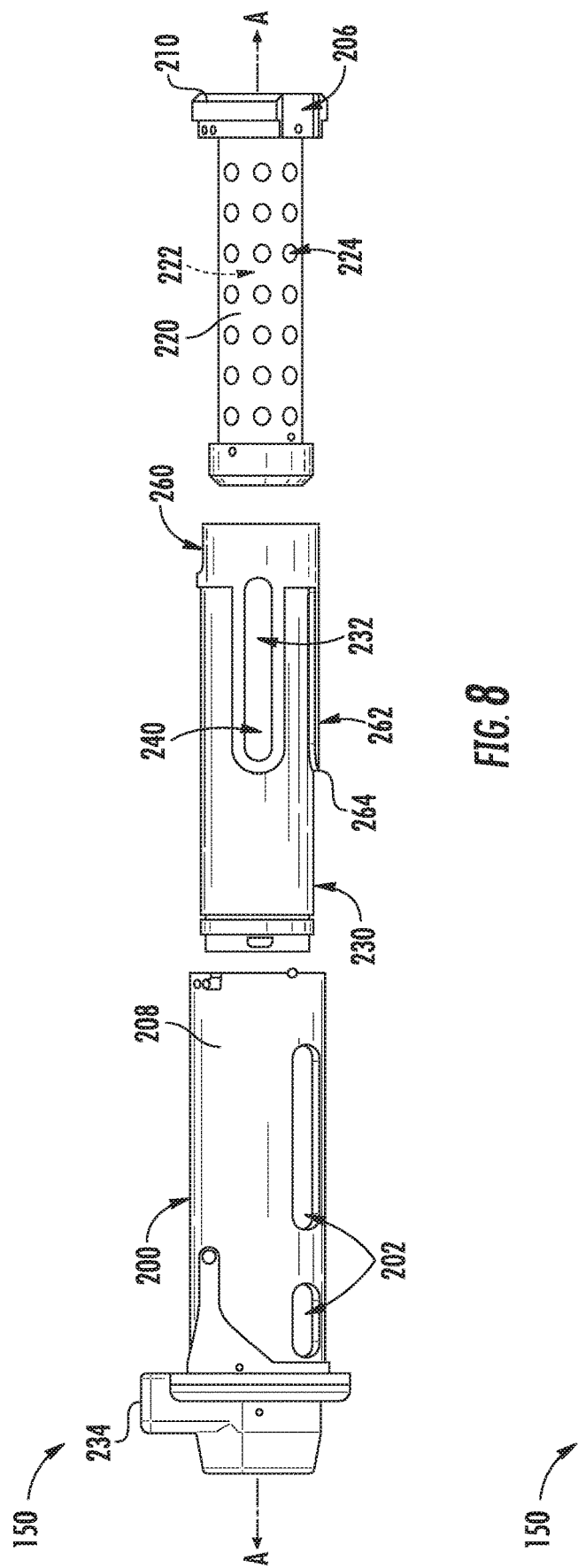
FIG. 8 provides an exploded view of the exemplary smoke regulating assembly of FIG. 6.
Figure 9:
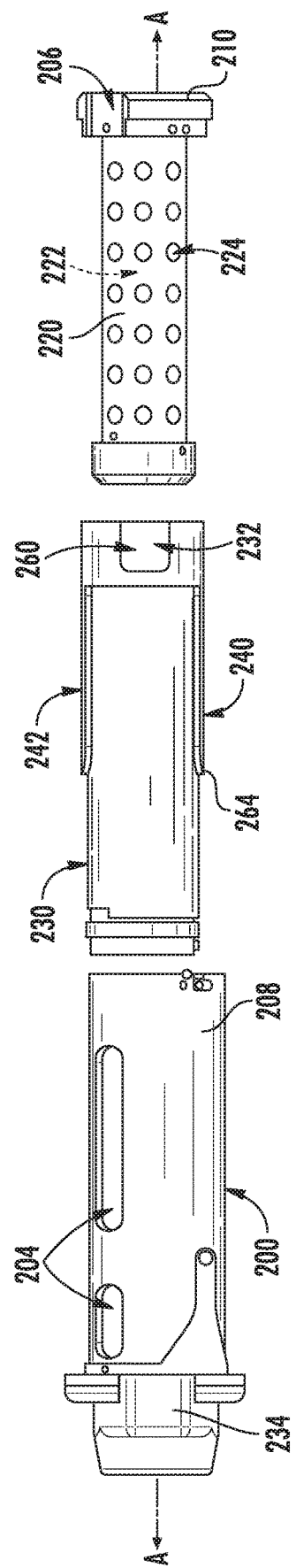
FIG. 9 provides another exploded view of the exemplary smoke regulating assembly of FIG. 6.

Referring now generally to FIGS. 3 through 6, various internal components of indoor smoker 100 and their respective functions will be described according to an exemplary embodiment of the present subject matter. In this regard, FIGS. 3 through 5 illustrate various perspective views of indoor smoker 100 with various panels of cabinet 102 removed for clarity. FIG. 6 provides a schematic illustration of indoor smoker 100 according to an exemplary embodiment of the present subject matter. Although an exemplary embodiment is described herein, it should be appreciated that the present subject matter is not limited to any specific configuration of indoor smoker 100.

As shown, indoor smoker 100 generally includes smoking chamber 120 for receiving items to be cooked/smoked and a smoke regulating assembly 150 which is used for generating and directing a flow of smoke (e.g., as indicated by reference numeral 152 in FIG. 6) within indoor smoker 100. A fresh air supply duct 154 provides a flow of combustion air or fresh air (e.g., as indicated by reference numeral 156 in FIG. 6) from the ambient environment 158 surrounding indoor smoker 100 or from another air supply source. In this regard, the flow of fresh air 156 is used to support the combustion or smoldering process within smoke regulating assembly 150. Specifically, for example, during a smoking process, combustible material (not shown) is ignited and the flow of fresh air 156 supports the smoldering process to generate the flow of smoke 152. In addition, indoor smoker includes an exhaust system 160 for safely discharging the flow of air 156 and/or smoke 152 back into the indoor environment 158 (i.e., outside of indoor smoker 100). Each of these systems and components will be described in detail below.

Exhaust system 160 is generally configured for safely discharging the flow of smoke 152 from indoor smoker 100. Specifically, according to the illustrated embodiment, exhaust system 160 generally extends between a chamber outlet 170 (see FIGS. 5 and 6) and a discharge vent 172 (see FIG. 3) defined by cabinet 102 for directing the flow of smoke 152 from smoking chamber 120 to the environment 158. Although an exemplary exhaust system 160 is described below, it should be appreciated that variations and modifications may be made while remaining within the scope of the present subject matter. For example, the routing of ducts, the position of fans and dampers, and the types of sensors used may vary according to alternative embodiments.

As shown, exhaust system 160 includes an exhaust duct 174 that generally extends between and provides fluid communication between chamber outlet 170 and discharge vent 172. Indoor smoker 100 further includes an air handler 176 for urging the flow of fresh air 156 into smoke regulating assembly 150. In this regard, air handler 176 is operably coupled with exhaust duct 174 for urging the flow of smoke 152 through exhaust duct 174 and out of discharge vent 172 to environment 158. According to the illustrated exemplary embodiment, air handler 176 may be an axial fan positioned within exhaust duct 174. However, it should be appreciated that according to alternative embodiments, air handler 176 may be positioned at any other suitable location and may be any other suitable fan type, such as an tangential fan, a centrifugal fan, etc.

In addition, according to an exemplary embodiment, air handler 176 is a variable speed fan such that it may rotate at different rotational speeds, thereby generating different air flow rates. In this manner, the flow of smoke 152 may be continuously and precisely regulated. Moreover, by pulsing the operation of air handler 176 or throttling air handler 176 between different rotational speeds, the flow of smoke 152 drawn into smoking chamber 120 may enter from a different direction, may have a different flow velocity, or may generate a different flow pattern within smoking chamber 120. Thus, by pulsating the variable speed fan or otherwise varying its speed, the flow of smoke 152 may be randomized, thereby eliminating stagnant regions within smoking chamber 120 and better circulating the flow of smoke 152 to provide a more even cooking/smoking profile.

As illustrated, indoor smoker 100 further includes a catalytic converter 180 which is positioned within exhaust duct 174 for lowering or removing volatile organic compounds (VOCs) from the flow of smoke 152. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 180 generally includes a catalytic element 182 and a catalyst heater 184. In general, catalytic element 182 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 182 may combine oxygen ($O_2$) with carbon monoxide (CO) and unburned hydrocarbons to produce carbon dioxide (CO2) and water (H2O). In addition, according to exemplary embodiments, catalytic element 182 may remove nitric oxide (NO) and nitrogen dioxide (NO2).

Notably, catalytic converters typically require that the catalyst be heated to a suitably high temperature in order to catalyze the necessary chemical reactions. Therefore, catalyst heater 184 is in thermal communication with catalytic element 182 for heating it to a suitable temperature, such as approximately 800° F. According to the illustrated embodiment, catalyst heater 184 is positioned upstream of catalytic element 182 to provide thermal energy through convection. However, it should be appreciated that according to alternative embodiments, catalyst heater 184 may be in direct contact with catalytic element 182 to provide thermal energy through conduction, or may be thermally coupled to catalytic element 182 in any other suitable manner.

Thus, during operation of indoor smoker 100, air handler 176 draws the flow of fresh air 156 into smoke regulating assembly 150 to facilitate the smoldering process and generate the flow of smoke 152. The flow of smoke 152 may then be drawn into smoking chamber 120 (as described in detail below) for performing a smoking process on food items positioned therein before exiting smoking chamber 120 through chamber outlet 170. Air handler 176 continues to urge the flow of smoke 152 through catalytic converter 180 and exhaust duct 174, thereby reducing harmful VOCs or other emissions, before passing out discharge vent 172 and into the ambient environment 158.

In order to ensure a desirable cooking temperature within smoking chamber 120, indoor smoker 100 further includes a chamber heater 190 (see FIG. 2) that is positioned within or otherwise in thermal communication with smoking chamber 120 for regulating the temperature in smoking chamber 120. In general, chamber heater 190 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 190 is operated independently of smoke regulating assembly 150 (e.g., as described below), smoking chamber 120 may be maintained at any suitable temperature during a smoking process. More specifically, for example, chamber heater 190 may be turned off or on a very low setting for smoking cheeses or may be turned on high for quickly cooking and smoking meats.

Referring now generally to FIGS. 6 through 13, smoke regulating assembly 150 will be described according to an exemplary embodiment of the present subject matter. In general, smoke regulating assembly 150 is positioned within cabinet 102 and is configured for selectively directing the flow of smoke 152 and the flow of fresh air 156 throughout smoking chamber 120 and/or exhaust duct 174. Although smoke regulating assembly 150 is described herein as being used with indoor smoker 100, it should be appreciated that aspects of the present subject matter may be applied to other indoor smokers, outdoor smokers, or any other appliance to facilitate flow regulation of gases and fluids.

In general, smoke regulating assembly 150 is operably coupled to fresh air supply duct 154, smoking chamber 120, and/or exhaust duct 174 for regulating the flow of smoke 152 and/or the flow of fresh air 156 within indoor smoker 100. More specifically, according to the exemplary embodiment, smoke regulating assembly 150 includes an outer housing 200 which generally defines an inlet aperture 202 and an outlet aperture 204. More specifically, inlet aperture 202 may include a first or front inlet and a second or rear inlet which are spaced apart along the transverse direction T. Inlet aperture 202 is fluidly coupled with fresh air supply duct 154 for receiving the flow of fresh air 156. Similarly, outlet aperture 204 may include a first or front outlet and a second or rear outlet which are spaced apart along the transverse direction T. Outlet aperture 204 may be fluidly coupled with smoking chamber 120 for providing one or both of the flow of smoke 152 and the flow of fresh air 156 into smoking chamber 120. According to an exemplary embodiment, inlet aperture 202 and outlet aperture 204 are defined on opposite sides of outer housing 200 (e.g., such that they are spaced apart by approximately 180 degrees).

Figure 12:
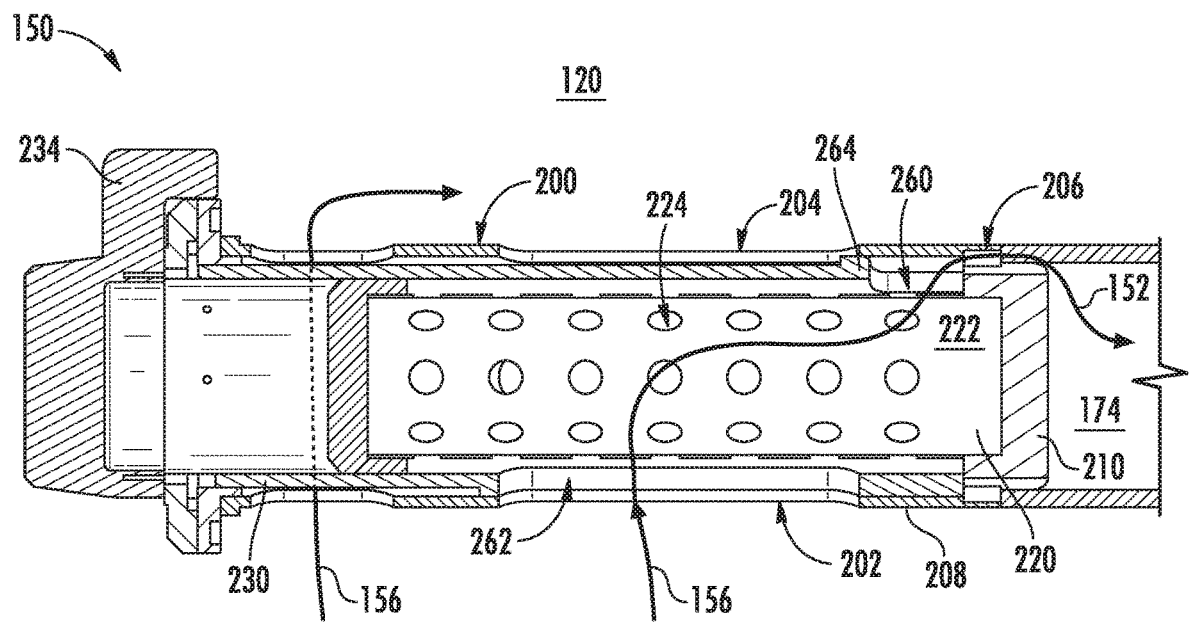
FIG. 12 provides a cross sectional view of the exemplary smoke regulating assembly of FIG. 6 in a pause position.

Referring briefly to FIGS. 6 and 12, outer housing 200 may further define a bypass port 206 that fluidly couples smoke regulating assembly 150 with exhaust duct 174. More specifically, outer housing 200 may include a substantially cylindrical sleeve 208 and an endcap 210 which is inserted into encloses an open end of cylindrical sleeve 208. Endcap 210 may define an aperture or recess that at least partially defines a bypass port 206. In this manner, as described in detail below, it may be desirable to direct the flow of smoke 152 directly into exhaust duct 174 and to bypass smoking chamber 120 altogether. Bypass port 206 permits such operation of smoke regulating assembly 150.

As best shown in FIGS. 8 through 13, smoke regulating assembly 150 further includes a firebox 220 positioned within the outer housing 200. Firebox 220 generally defines a smoldering chamber 222 which is configured for receiving combustible material (not shown). Specifically, as illustrated, firebox 220 may include a perforated metal sheet that defines a plurality of perforations 224. However, it should be appreciated that according to alternative embodiments, firebox 220 may have any other suitable construction and may be formed from any other suitable material or materials. For example, firebox 220 may be formed from a plurality of steel mesh sheets that are positioned, oriented, joined together to form smoldering chamber 222. Notably the apertures within mesh sheets or perforations 224 may have any size suitable for permitting the flow of fresh air 156 to pass through firebox 220 and the combustible material, while substantially containing or preventing the combustible material from falling through or out of firebox 220.

Referring specifically to FIG. 6, firebox 220 includes one or more smoldering heaters 226 which are positioned in smoldering chamber 222 or otherwise placed in thermal communication with the combustible material stored in smoldering chamber 222 for smoldering the combustible material. Smoldering heater 226 may include one or more heating elements such as electric resistance heating elements, gas burners, microwave heating elements, halogen heating elements, or suitable combinations thereof. According to an exemplary embodiment, smoldering heaters 226 are cartridge heaters or a silicon nitride igniters.

As used herein, "combustible material" is generally used to refer to any suitable material positioned within smoldering chamber 222 for generating smoke. Specifically, according to exemplary embodiments, the combustible material includes wood or wood byproducts, such as wood chunks, wood chips, wood pellets, or wood resin. In addition, as used herein, the verb "smolder" or variations thereof is intended to refer to burning a combustible material (e.g., the combustible material) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 226 positioned within smoldering chamber 222. For typical combustible material used in smokers, e.g., wood and wood byproducts, a typical smoldering temperature is between about 650° F. and 750° F. However, the exact temperature may vary depending on the combustible material used, the air flow rate through smoldering chamber 222, the level of the combustible material, and other factors.

Referring again generally to FIGS. 6 through 13, smoke regulating assembly 150 further includes a control cylinder 230 which is mounted within outer housing 200 and around firebox 220. Control cylinder 230 defines a plurality of flow regulating apertures 232 and is rotatable to selectively align the flow regulating apertures 232 with inlet aperture 202, outlet aperture 204, and/or bypass port 206 to regulate the flow of fresh air 156 and the flow of smoke 152 within indoor smoker 100.

Specifically, as illustrated, outer housing 200 and firebox 220 are fixed within an indoor smoker 100. By contrast, control cylinder 230 is rotatably mounted between firebox 220 and outer housing 200 and rotates about an axis of rotation A which is defined substantially parallel to the transverse direction T. According to an exemplary embodiment, a user may rotate control cylinder 230, e.g., using a handle 234 positioned at a bottom front panel of cabinet 102, to selectively align flow regulating apertures 232 and place smoke regulating assembly 150 in a desired operating position.

According to alternative embodiments, smoke regulating assembly 150 may include a motor 236 (see, e.g., FIG. 6) mechanically coupled to control cylinder 230 and being configured for adjusting the angular position of control cylinder 230. In this regard, for example, a user may program a smoking process using user interface panel 134 and controller 140 may automate operation of control cylinder 230 by controlling motor 236. As used herein, "motor" may refer to any suitable drive motor and/or transmission assembly for rotating a system component. For example, motor 236 may be a brushless DC electric motor, a stepper motor, or any other suitable type or configuration of motor. Alternatively, for example, motor 236 may be an AC motor, an induction motor, a permanent magnet synchronous motor, or any other suitable type of AC motor. In addition, motor 236 may include any suitable transmission assemblies, clutch mechanisms, or other components.

Figure 10:
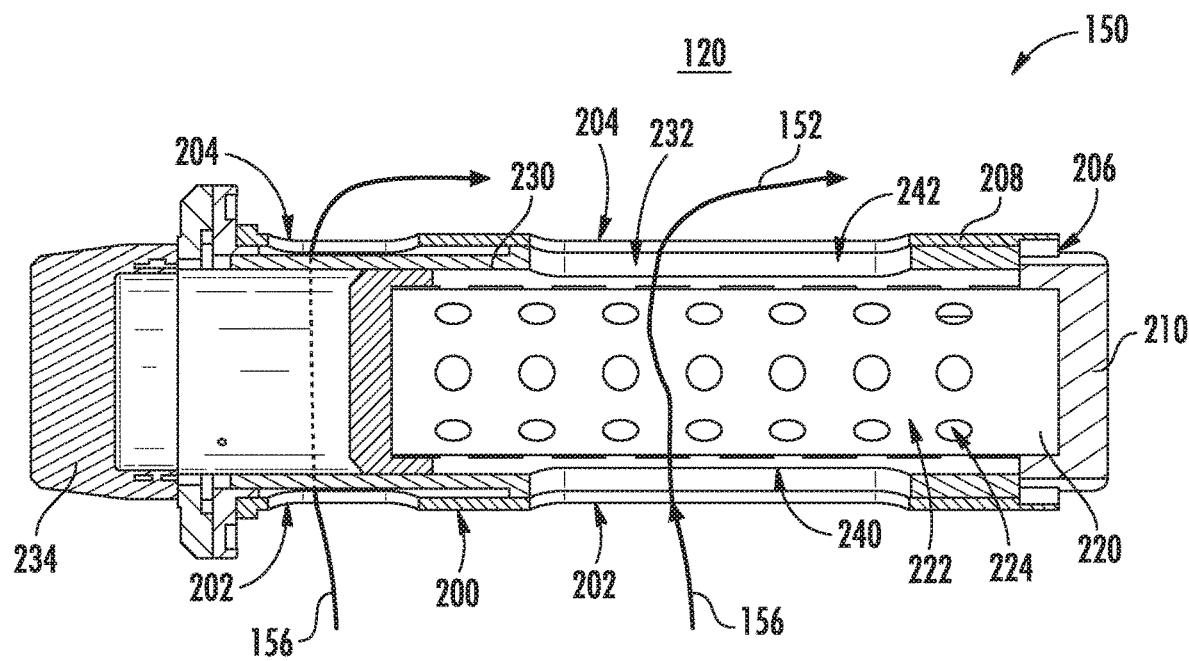
FIG. 10 provides a cross sectional view of the exemplary smoke regulating assembly of FIG. 6 in a smoking position.

As illustrated, according to an exemplary embodiment, flow regulating apertures 232 may include a fresh air inlet 240 and a smoke outlet 242. When control cylinder 230 is rotated to a "smoking position," fresh air inlet 240 is aligned with or fluidly coupled with inlet aperture 202 and smoke outlet 242 is aligned with or fluidly coupled with outlet aperture 204. In this manner, as best shown in FIG. 10, the flow of fresh air 156 may pass through inlet aperture 202 of outer housing 200, through fresh air inlet 240 of control cylinder 230, and through perforations 224 of firebox 220 into smoldering chamber 222 to facilitate the smoldering or combustion process. Generated smoke in smoldering chamber 222 may then pass through smoke outlet 242, through outlet aperture 204, and into smoking chamber 120 to perform a smoking process.

Figure 11:
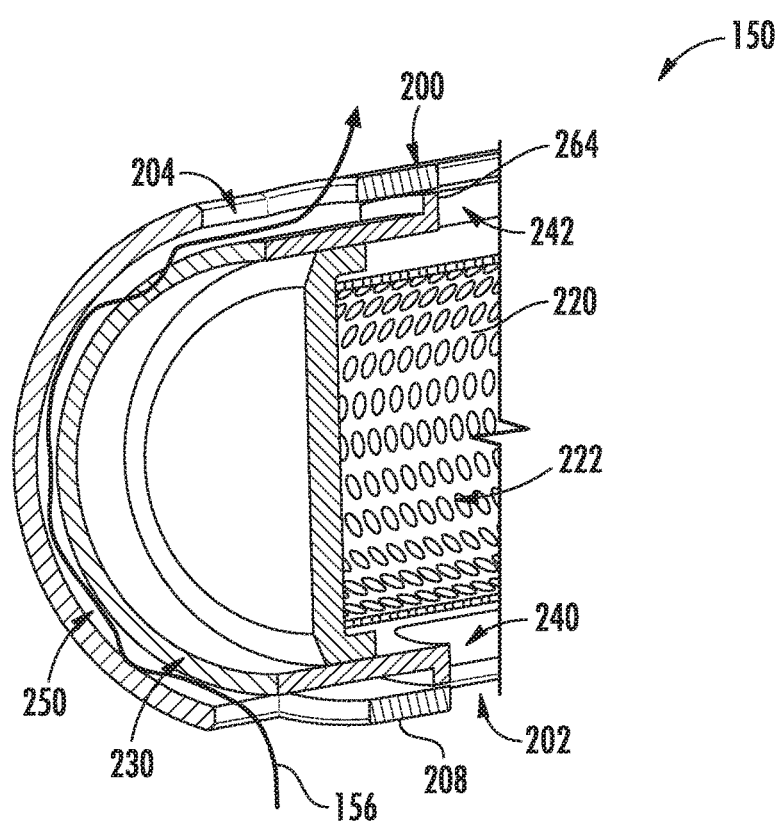
FIG. 11 provides another cross sectional view of the exemplary smoke regulating assembly of FIG. 6 illustrating a flow of fresh air through the smoke regulating assembly.

Notably, referring to FIGS. 10 and 11, flow regulating assembly 150 may further include an annular gap 250 that is defined between the control cylinder 230 and outer housing 200 for fluidly coupling inlet aperture 202 with outlet aperture 204. In this regard, control cylinder 230 may have a nominal outer diameter that is less than the inner diameter of outer housing 200. In this manner, the flow of fresh air 156 may pass through inlet aperture 202, around control cylinder 230 through annular gap 250, and into smoking chamber 120 through outlet aperture 204. In this manner, the flow smoke 152 and the flow of fresh air 156 may merge and intermingle in order to reduce the temperature of the flow of smoke 152 to permit cold smoking processes. In addition, as illustrated, annular gap 250 is defined proximate a front of control cylinder 230 (e.g. proximate front 112 of cabinet 102), such that handle 234 is cooled to prevent burns or undesirably hot front surfaces.

As explained briefly above, in certain conditions, it may be desirable to pause the smoking process to permit a user to access food items within smoking chamber 120 without exhausting the flow of smoke 152 into the ambient environment 158. However, it may also be desirable that during the pause process, the combustible material in smoldering chamber 222 is not asphyxiated, so that the smoking process may proceed after door 126 is closed.

Thus, referring now to FIG. 12, in order to achieve such a pause in the smoking process, flow regulating features 232 may further include a bypass aperture 260, wherein rotating control cylinder 232 a pause position aligns bypass aperture 260 with bypass port 206 in order to provide direct fluid communication between smoldering chamber 222 and exhaust duct 174. In addition, control cylinder 260 may define an auxiliary air inlet 262 which is aligned with inlet aperture 202 when control cylinder 230 is rotated to the pause position. Notably, aligning bypass aperture 260 and bypass port 206 also closes outlet aperture 204 to prevent the flow smoke 152 from entering smoking chamber 120. Simultaneously, auxiliary air inlet 262 permits the flow of fresh air 156 into smoldering chamber 222 in order to prevent the combustible material from being snuffed out or asphyxiated.

Notably, when control cylinder 230 is in the pause position, the flow of fresh air 156 may still pass through annular gap 250 into smoking chamber 120. Thus, air handler 176 may draw the flow of fresh air 156 through smoking chamber 120 and into exhaust duct 174 through chamber outlet 170. In this manner, smoking chamber 120 may be evacuated from smoke such that a user may open door 126 without permitting smoke to exhaust into ambient environment 158. Notably, in order to permit a fluid seal between control cylinder 230 and outer housing 200, each of fresh air inlet 240, smoke outlet 242, a bypass aperture 260, and auxiliary air inlet 262 may be defined by raised flanges 264 that extend from control cylinder 230 through annular gap 250 to contact outer housing 200.

Figure 13:
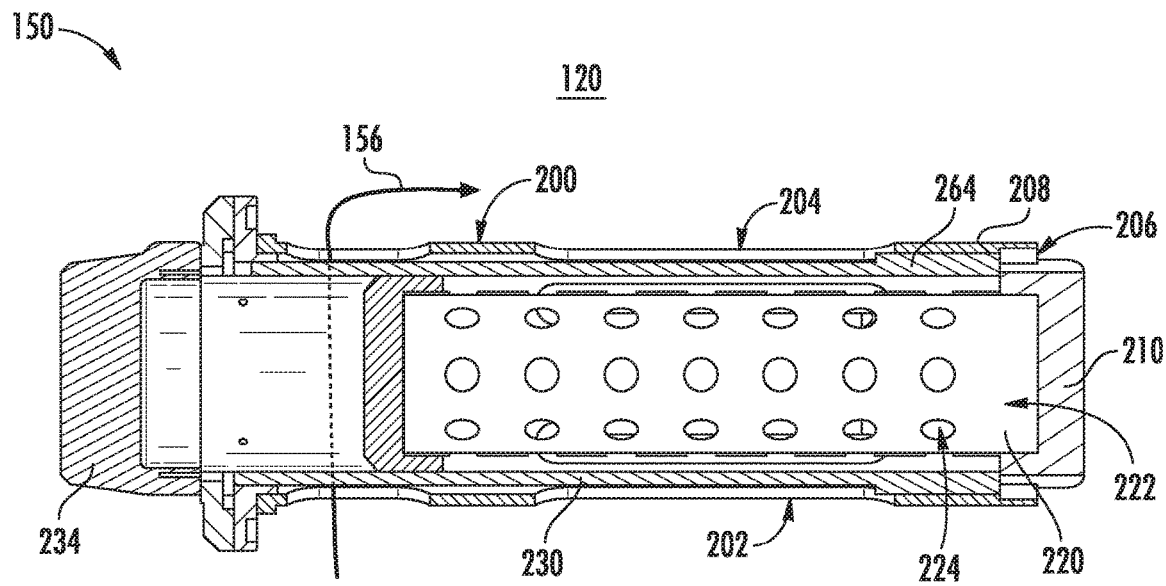
FIG. 13 provides a cross sectional view of the exemplary smoke regulating assembly of FIG. 6 in a termination position.

Referring now briefly to FIG. 13, a user may terminate the smoking process by sealing off smoldering chamber 222 and drawing the flow of fresh air 156 through smoking chamber 120 and out exhaust duct 174. Specifically, when control cylinder 230 is rotated to the termination or evacuation position, fresh air inlet 240 and smoke outlet 242 are blocked or otherwise not in alignment with inlet aperture 202 and outlet aperture 204. In this manner, no air is permitted in or out of smoldering chamber 222, thereby asphyxiating the combustible material located therein and terminating the smoking process. Simultaneously, the flow of fresh air 156 may pass through annular gap 250 to permit evacuation of smoking chamber 120.

As described above, smoke regulating assembly 150, or more specifically control cylinder 230, may be rotatable or movable between several angular positions in order to manipulate the flow of smoke 152 and the flow of fresh air 156 within indoor smoker 100. Specifically, for example, control cylinder 230 may be moved between a smoking position, and evacuation/termination position, a pause position, and/or a cold smoking position. Although operation of indoor smoker 100 is described above as using these four operating positions, it should be appreciated that the present subject matter is not limited to the operating modes described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical, a lateral, and a transverse direction, the indoor smoker comprising:
    a cabinet;
    a smoking chamber positioned within the cabinet;
    a smoke regulating assembly operably coupled with the smoking chamber, the smoke regulating assembly comprising:
        an outer housing defining an inlet aperture and an outlet aperture, wherein the inlet aperture comprises a first inlet and a second inlet defined proximate a bottom of the outer housing, and wherein the outlet aperture comprises a first outlet and a second outlet defined proximate a top of the outer housing;
        a firebox positioned within and fixed relative to the outer housing, the firebox defining a smoldering chamber for receiving combustible material and a flow of fresh air to generate a flow of smoke; and
        a control cylinder rotatably mounted within the outer housing and around the firebox, the control cylinder defining a plurality of flow regulating apertures and being rotatable to selectively align the flow regulating apertures with the inlet aperture and the outlet aperture to regulate the flow of fresh air and the flow of smoke.

2. The indoor smoker of claim 1, wherein the inlet aperture is fluidly coupled to a fresh air supply duct and the outlet aperture is fluidly coupled to the smoking chamber.

3. The indoor smoker of claim 1, wherein the flow regulating apertures comprise a fresh air inlet and a smoke outlet, wherein the fresh air inlet is fluidly coupled with the inlet aperture and the smoke outlet is fluidly coupled with the outlet aperture when the smoke regulating assembly is in a smoking position.

4. The indoor smoker of claim 3, wherein the outer housing defines a bypass port and the flow regulating apertures comprise a bypass aperture, wherein the smoldering chamber is fluidly coupled with an exhaust duct when the bypass aperture is aligned with the bypass port.

5. The indoor smoker of claim 4, wherein the flow regulating apertures comprise an auxiliary air inlet, wherein the auxiliary air inlet is aligned with the inlet aperture when the smoke regulating assembly is in a pause position.

6. The indoor smoker of claim 5, wherein the fresh air inlet, the smoke outlet, the bypass aperture, and the auxiliary air inlet are defined by raised flanges that extend from the control cylinder through an annular gap to contact the outer housing.

7. The indoor smoker of claim 5, wherein the control cylinder is rotatable to the following positions:
    the smoking position where the fresh air inlet is aligned with the inlet aperture and the smoke outlet is aligned with the outlet aperture such that the smoldering chamber is in fluid communication with the smoking chamber;
    an evacuation position where the fresh air inlet and the smoke outlet are blocked; and
    the pause position where the fresh air inlet is open and the bypass aperture is aligned with the bypass port.

8. The indoor smoker of claim 1, wherein an annular gap is defined between the control cylinder and the outer housing, the annular gap fluidly coupling the inlet aperture with the outlet aperture such that the flow of fresh air may pass through the annular gap and into the smoking chamber.

9. The indoor smoker of claim 8, wherein the annular gap is defined proximate a front of the smoke regulating assembly to facilitate cooling of a handle of the smoke regulating assembly.

10. The indoor smoker of claim 1, wherein the smoke regulating assembly comprises:
    a motor mechanically coupled to the control cylinder and being configured for adjusting an angular position of the control cylinder.

11. The indoor smoker of claim 1, wherein the firebox comprises a steel mesh or perforated metal plate.

12. The indoor smoker of claim 4, wherein the exhaust duct extends between a chamber outlet and a discharge vent, and wherein the bypass port is fluidly coupled to the exhaust duct.

13. The indoor smoker of claim 12, comprising:
    a catalytic converter positioned within the exhaust duct for lowering volatile organic compounds within the flow of smoke.

14. The indoor smoker of claim 12, comprising:
    an air handler operably coupled with the exhaust duct for urging at least one of the flow of fresh air and the flow of smoke through the exhaust duct.

15. The indoor smoker of claim 1, comprising:
    a chamber heater for heating the smoking chamber.

16. A smoke regulating assembly operably coupled with a smoking chamber, the smoke regulating assembly comprising:
    an outer housing defining an inlet aperture and an outlet aperture;
    a firebox positioned within and fixed relative to the outer housing, the firebox defining a smoldering chamber for receiving combustible material and a flow of fresh air to generate a flow of smoke; and
    a control cylinder rotatably mounted within the outer housing and around the firebox, the control cylinder defining a plurality of flow regulating apertures and being rotatable to selectively align the flow regulating apertures with the inlet aperture and the outlet aperture to regulate the flow of fresh air and the flow of smoke, wherein the control cylinder is rotatable to the following positions:
        a smoking position where a fresh air inlet is aligned with the inlet aperture and a smoke outlet is aligned with the outlet aperture such that the smoldering chamber is in fluid communication with the smoking chamber;
        an evacuation position where the fresh air inlet and the smoke outlet are blocked; and
        a pause position where the fresh air inlet is open and a bypass aperture is aligned with a bypass port.

17. The smoke regulating assembly of claim 16, wherein an annular gap is defined between the control cylinder and the outer housing, the annular gap fluidly coupling the inlet aperture with the outlet aperture such that the flow of fresh air may pass through the annular gap and into the smoking chamber.

18. The smoke regulating assembly of claim 16, comprising:
  a motor mechanically coupled to the control cylinder and being configured for adjusting an angular position of the control cylinder.

19. A smoke regulating assembly operably coupled with a smoking chamber, the smoke regulating assembly comprising:
  an outer housing defining an inlet aperture and an outlet aperture;
  a firebox positioned within and fixed relative to the outer housing, the firebox defining a smoldering chamber for receiving combustible material and a flow of fresh air to generate a flow of smoke; and
  a control cylinder rotatably mounted within the outer housing and around the firebox, the control cylinder defining a plurality of flow regulating apertures and being rotatable to selectively align the flow regulating apertures with the inlet aperture and the outlet aperture to regulate the flow of fresh air and the flow of smoke, wherein the flow regulating apertures comprise a fresh air inlet and a smoke outlet, wherein the fresh air inlet is fluidly coupled with the inlet aperture and the smoke outlet is fluidly coupled with the outlet aperture when the smoke regulating assembly is in a smoking position.

20. The smoke regulating assembly of claim 19, wherein the control cylinder is rotatable to the following positions:
  an evacuation position where the fresh air inlet and the smoke outlet are blocked; and
  a pause position where the fresh air inlet is open and a bypass aperture is aligned with a bypass port.

* * * * *